United States Patent Office 2,858,483
Patented Oct. 28, 1958

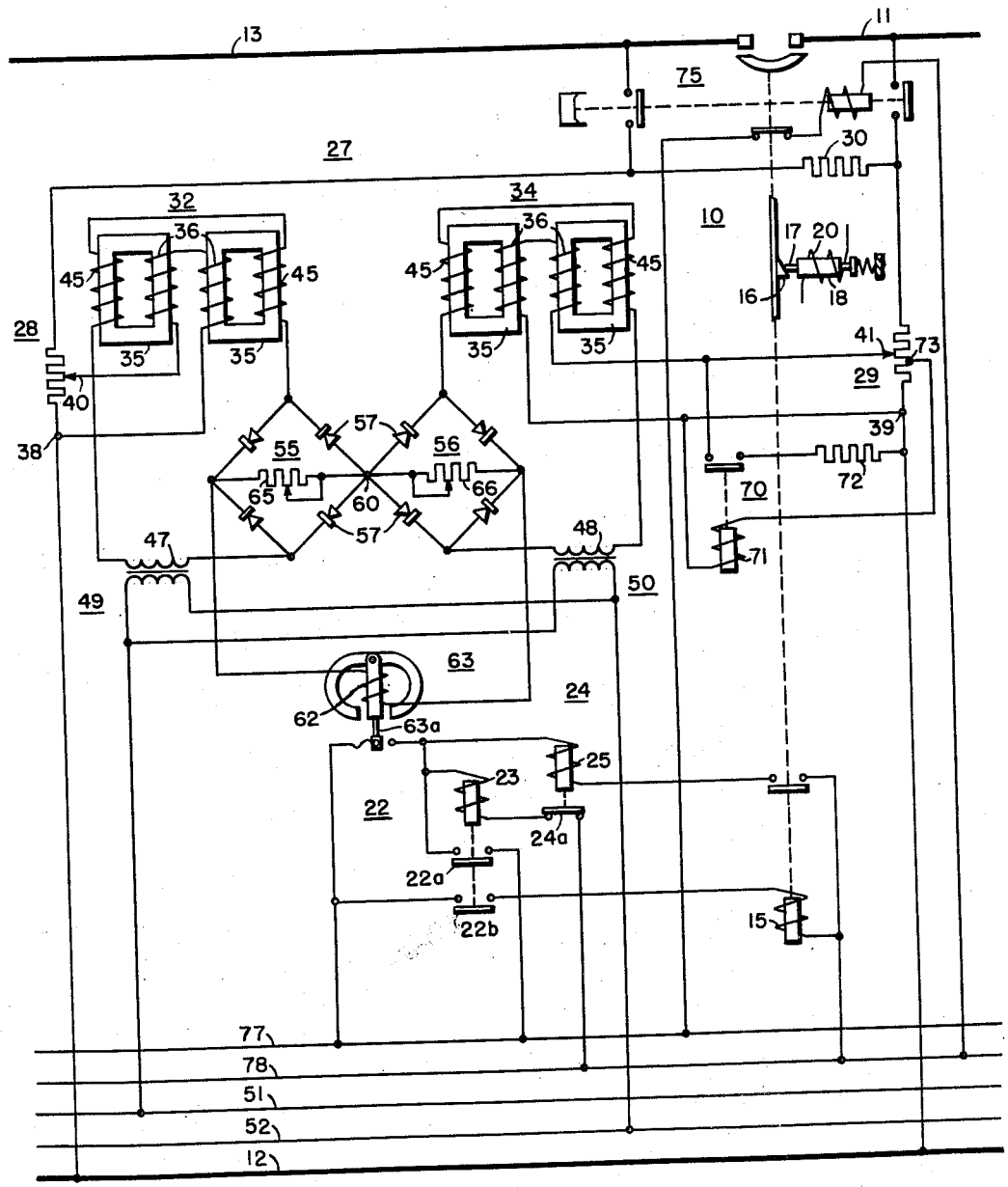

2,858,483

RECLOSING CIRCUIT BREAKER SYSTEMS

George W. Pickels IV, Forest Hills, and Guy W. H. Champney, Monroeville, Pa., assignors to Westinghouse Electric Corporation, East Pittsburgh, Pa., a corporation of Pennsylvania Application September 22, 1954, Serial No. 457,618

6 Claims. (Cl. 317—23)

Our invention relates generally to reclosing circuit breaker systems and it has reference in particular to load measuring reclosing circuit breaker systems.

Generally stated, it is an object of our invention to provide in a load measuring reclosing circuit breaker system for using magnetic amplifiers in the load measuring circuit.

More specifically, it is an object of our invention to provide in a load measuring reclosing circuit breaker system for controlling a sensitive direct current load measuring relay by means of magnetic amplifiers responsive to circuit conditions of both the source and the load.

Another object of our invention is to provide in a reclosing circuit breaker system for using magnetic amplifiers individual to a supply circuit and a load circuit for controlling a load measuring relay in accordance with a voltage differential between the supply circuit and the load circuit.

Yet another object of our invention is to provide in a load measuring reclosing circuit breaker system for using separate magnetic amplifiers on the source and load sides of the circuit breaker for controlling operation of a load measuring relay.

It is also an important object of our invention to provide in a load measuring reclosing circuit breaker system for using magnetic amplifiers in conjunction with a voltage responsive recalibrating relay for operating a load measuring relay under conditions of either stub or parallel feed.

Other objects will, in part, be obvious and will, in part, be explained hereinafter.

In practicing our invention in accordance with one of its embodiments, a Wheatstone bridge load measuring circuit is provided in connection with a circuit breaker, comprising voltage dividing resistors connected across the source and load sides of the breaker in conjunction with a resistor connecting the load and the source when the breaker is open. Magnetic amplifiers having control windings energized from the voltage dividing resistors are provided with load windings connected to an alternating current source through opposed rectifier bridge circuits for operating a direct current load measuring relay in accordance with a differential between the output voltages of the bridge circuits for effecting operation of the breaker when the load resistance is of a sufficient value.

For a more complete understanding of the nature and the scope of our invention, reference may be made to the following detailed description which may be read in connection with the accompanying drawing, in which the single figure is a schematic diagram of a load measuring reclosing circuit breaker system embodying the invention in one of its forms.

Referring to the drawing, the reference numeral 10 may designate a circuit breaker for connecting a load circuit comprising conductors 11 and 12 to a direct current source or supply circuit comprising conductors 12 and 13. The circuit breaker 10 may be of any suitable type and is herein shown as having a closing coil 15 for operating the breaker to the closed position, and is provided with suitable latch means for retaining it in the closed position, such as the latch detent 16 which engages a projection 17 on the armature 18 of a trip device having a trip winding 20 which may be energized in any suitable manner for operating the trip device to open the breaker. Energization of the closing coil 15 is effected by means of a closing relay 22 having an operating winding 23 and a cutoff relay 24 having an operating winding 25 which functions to deenergize the closing relay when the breaker closes.

In order to provide for closing the circuit breaker 10, only when circuit conditions of the load circuit are correct, a load measuring circuit 27 may be provided comprising voltage dividing resistors 28 and 29 connected across the supply and load circuits, respectively, adjacent the circuit breaker 10, in conjunction with a load measuring resistor 30 which is connected across the circuit breaker 10 to constitute one arm of the Wheatstone bridge, the load constituting the arm whose resistance is to be measured. It further serves to limit the current which may flow to the load circuit from the supply circuit when the circuit breaker 10 is open. Instead of connecting a load measuring relay in the usual balance circuit of the Wheatstone bridge circuit, magnetic amplifiers 32 and 34 are provided comprising core members 35 of magnetic material having direct current control windings 36 thereon which are connected respectively across portions of the voltage dividers 28 and 29, being for example connected between terminal points 38, 39 and adjustable intermediate taps 40 and 41 respectively. Each of the magnetic amplifiers 32 and 34 is also provided with load windings 45 which are connected in series with the secondary windings 47 and 48 of transformers 49 and 50 which are connected to an alternating current source represented by conductors 51 and 52. Connected in each of these series circuits are rectifier bridge circuits 55 and 56 comprising a plurality of rectifier devices 57 connected in a full wave circuit arrangement. The bridge circuits 55 and 56 are connected together at junction 60 in opposed relation and the operating winding 62 of a load measuring relay 63 is connected across the output circuits of the bridge circuits for operation in accordance with a differential between the output voltages thereof. Load resistors 65 and 66 are connected in the output circuits of each of the bridge circuits.

In order to provide for recalibrating the measuring circuit 27 for controlling operation of the circuit breaker 10 when the load circuit 11—12 is energized from some other source, a recalibrating relay 70 may be provided having an operating winding 71 connected between the terminal points 39 and 73 of the voltage divider 29 for operation in response to a voltage on the load circuit which is greater than the reduced voltage applied thereto by the load measuring resistor 30. The recalibrating relay 70 is utilized to connect a recalibrating resistor 72 between terminal points 41 and 39 of the voltage divider 29 so as to recalibrate the bridge circuit 27 for controlling closing of the circuit breaker 10, only when there is a predetermined minimum differential between the voltages of the load circuit and the supply circuit. In order to minimize the service on the resistors 28 and 29, switch means such as contactor or relay 75 may be provided for disconnecting the resistors 28 and 29 from the supply circuit and the load circuit a predetermined time after the circuit breaker 10 is closed.

When the circuit breaker 10 is tripped in response to a fault condition or the like, contactor 75 operates, and the resistors 28 and 29 will be connected to the supply and load circuits. If no voltage is applied to the load circuit conductor 11 from any other source, the recalibrating relay 70 will remain in the deenergized position and the load measuring circuit 27 will remain calibrated for measuring the resistance of the load circuit. The control windings 36 on the magnetic amplifiers 32 and 34 are energized in accordance with the voltages existing across their respective portions of resistors 28 and 29. This energization determines the impedance of the respective load windings 45 and hence determines the voltages of the bridge circuits 55 and 56. When the resistance of the load circuit is sufficient to limit the current flow to a safe value if the breaker 10 should be closed, the voltage differential between the bridge circuits 55 and 56 will be of a sufficient value and in a direction to close the load measuring relay 63. This provides an energizing circuit for the operating winding 23 of the closing relay 22 through contact member 63a from the control bus conductors 77 and 78. The closing relay operates, providing an energizing circuit for energizing closing coil 15 through contact member 22b, and provides a holding circuit for its own operating winding 23 through contact member 22a. When the circuit breaker closes, an energizing circuit is provided for energizing operating winding 25 of the cutoff relay 24, which interrupts the energizing circuit for the closing relay 22 at contact member 24a. A predetermined time after the circuit breaker closes, the control relay 75 operates to disconnect the voltage dividers 28 and 29 from the supply and load circuits.

Should the load circuit be connected to another source of direct current, the recalibrating relay 71 will be operated to the energized position, thus connecting recalibrating resistor 72 in parallel with a portion of the resistor 29 to recalibrate the load measuring circuit 27 for measuring the voltage of the load circuit. When the differential between the voltages of the load circuit and the supply circuit reaches a predetermined minimum value, which will not cause excessive current to flow upon closing of the circuit breaker, the load measuring relay 63 is operated by the differential voltage from the rectifier circuits 55 and 56 to effect closing of the circuit breaker in the same manner as previously described.

From the above description and the accompanying drawing, it will be apparent that we have provided a load measuring reclosing circuit breaker system in which the load measuring relay is entirely isolated from the high voltage breaker circuits which range from 600 volts D. C. to 3000 volts D. C. or more. Because of the amplifier action of the magnetic amplifiers, a high degree of sensitivity may be obtained with a minimum of input differential. A system embodying the features of our invention is readily applicable to both stub and multiple or parallel feed circuits.

Since certain changes may be made in the above described construction and different embodiments of the invention may be made without departing from the spirit and scope thereof, it is intended that all the matter contained in the above description and shown in the accompanying drawing shall be considered as illustrative and not in a limiting sense.

We claim as our invention:

1. In control apparatus for a circuit interrupter operable to connect a load circuit to a high voltage source of electricity, a load measuring circuit including voltage dividers on the source and load sides of the interrupter and an impedance device connected across the interrupter between the source an load circuit, a load measuring relay, and means including a magnetic amplifier individual to each of the voltage dividers for applying opposed voltages to the load measuring relay to operate it for closing the circuit interrupter.

2. In combination, a circuit interrupter operable to connect a load circuit to a high voltage direct current source, a load measuring circuit including a voltage divider connected on each the source and load sides of the interrupter and a load measuring impedance connected across said interrupter, a load measuring relay operable to effect operation of the interrupter, and means including a saturable reactor individual to each voltage divider having a control winding connected to said divider and a load winding connected to apply opposed voltages to the load measuring relay.

3. In a control system for a circuit breaker operable to connect a load circuit to a high voltage source, a voltage divider connected across the source and load sides of the breaker, a load measuring resistor connected across the circuit breaker for applying a predetermined relatively low voltage to the load circuit when the circuit breaker is open, means including a relay responsive only to a voltage in excess of said low voltage for changing the electrical characteristics of one of the voltage dividers, a load measuring relay, means including a magnetic amplifier and rectifier means connecting the load measuring relay to an alternating current source, said magnetic amplifier having a separate control circuit energized in response to a differential voltage from said voltage dividers, and circuit means connecting the load measuring relay for effecting operation of the breaker.

4. In combination, a circuit breaker operable to connect a load circuit to a high voltage direct current supply circuit, a load measuring circuit including voltage dividers connected across the supply circuit and the load circuit and a load measuring resistance connected across the circuit breaker, a magnetic amplifier individual to each voltage divider having a control winding connected to its voltage divider and a separate load winding, a load measuring relay operable to effect operation of the breaker, and circuit means connecting the load measuring relay to a source of alternating current including oppositely disposed rectifier circuits and said load windings.

5. In a control circuit for a circuit interrupter operable to connect a load circuit to a high voltage supply circuit, a load measuring circuit having an impedance device connected across each the load circuit and the supply circuit and an additional impedance device connected across the circuit interrupter, a load measuring relay operable to effect operation of the interrupter, a magnetic amplifier individual to each the supply circuit and load circuit impedance devices having a core of magnetic material with a separate load winding and control winding thereon, circuit means connecting the control windings across a portion of their respective impedance devices, and circuit means connecting the load measuring relay to an alternating current source through said load windings including a pair of full wave rectifier circuits connected one in circuit with each of the load windings and said source and to the load measuring relay in opposed relation.

6. A control circuit for a circuit interrupter operable to connect a load circuit to a high voltage direct current supply circuit comprising, a Wheatstone bridge load measuring circuit including a resistance element connected across each the supply circuit and the load circuit and a load measuring resistor connected across the circuit interrupter to apply a reduced voltage to the load circuit from the supply circuit when the interrupter is open, a magnetic amplifier individual to each the supply circuit and the load circuit having a core of magnetic material with a control winding and a separate load winding thereon, circuit means connecting the control windings across a portion of their respective resistance elements, additional circuit means connecting the load measuring relay to a source of alternating current including rectifier circuits for applying opposed voltages to the relay in accordance with the electrical characteristics of the supply and load circuits, and circuit means connected across the load circuit including a voltage relay for changing the effective value of the load circuit resistance element in response to a voltage in excess of said reduced voltage, to recalibrate the Wheatstone bridge circuit.

References Cited in the file of this patent

UNITED STATES PATENTS

| | | |
|---|---|---|
| 2,259,965 | Taliaferro | Oct. 21, 1941 |
| 2,345,155 | Reagan | Mar. 28, 1944 |
| 2,504,877 | Reagan | Apr. 18, 1950 |
| 2,594,022 | Horton | Apr. 22, 1952 |
| 2,691,747 | Giffin | Oct. 12, 1954 |